United States Patent Office 3,223,528
Patented Dec. 14, 1965

3,223,528
GELATIN DERIVATIVES AND PHOTOGRAPHIC SILVER HALIDE EMULSION LAYERS
Marcel Nicolas Vrancken, Ringlaan 31, Berchem-Antwerp, Belgium; Arthur Henri De Cat, Ter Varentstraat 62, Mortsel-Antwerp, Belgium; and Jozef Frans Willems, Sterrenlaan 52, Wilrijk-Antwerp, Belgium
No Drawing. Filed July 18, 1961, Ser. No. 124,819
Claims priority, application Great Britain, July 18, 1960, 25,009/60
3 Claims. (Cl. 96—94)

The present invention relates to derivatives of gelatin, to their preparation and to the preparation of photographic layers by means of such derivatives of gelatin.

It is already known for instance from British specifications 537,256 and 649,544 to form derivatives of gelatin by reaction with various organic compounds, for instance with anhydrides, carboxylic acid chlorides and sulfonylchlorides. For this purpose, however, it is necessary to dissolve these compounds in anhydrous solvents to prevent partial loss of the compounds by hydrolysis before the addition of the gelatin. Even when these compounds are dissolved in anhydrous solvents they are partially hydrolyzed when added to aqueous gelatin solutions.

It has now been found that sulfonyl derivatives of gelatin can be prepared by adding to a gelatin solution whilst vigorously stirring, a solution in water or in an organic solvent of an aromatic compound containing a sulfonylfluoride group. The gelatin may be dissolved in water or in a mixture of water and an organic solvent, such as in a mixture of 3 parts by volume of water with 2 parts of acetone. In another combination are used 100 parts of water, 35 parts of dimethylformamide and 20 parts of ethyl alcohol. A still other combination consists of 2 parts of water and 4 parts of dimethylformamide.

In comparison with the aromatic compounds containing sulfonylchloride groups, the aromatic compounds containing sulfonylfluoride groups are not only more stable to hydrolysis, but they can also be purified more easily. Moreover, the aromatic compounds containing sulfonylfluoride groups may also contain other reactive groups, for instance amino groups, which react with sulfonylchloride groups but do not react with the more inert sulfonylfluoride groups.

During the preparation according to this invention, the pH is kept above 7, preferably between 8 and 12, by means of a water-soluble base. Although the reaction is preferably carried out at about 45° C., lower or higher temperatures may be used. Too high temperatures for instance above 70° C. should, however, be avoided to reduce degradation of the gelatin. Depending upon the temperature, the reaction time will vary from ¼ hr. to 2 hrs.

As aromatic compounds containing sulfonylfluoride groups are preferably used arylamino sulfonylfluorides e.g. ortho-, meta- and para-aminobenzene sulfonylfluorides. These compounds may also be substituted in the benzene nucleus by one or more alkyl groups, halogen atoms and/or nitro groups. Methods of synthesising these compounds are described e.g. in De Cat, Congress Handbook, XIVth International Congress of Pure and Applied Chemistry, Zurich, Switzerland, 21–27th July 1955, p. 306.

Besides the aminobenzene sulfonylfluorides mentioned above also other aromatic compounds containing sulfonylfluoride groups may be used, such as p-toluene sulfonylfluoride, m-sulfonyl fluoride benzoic acid, p-sulfonylfluoride acetanilide, and p-fluorosulfonyl salicylic acid.

When preparing sulfonyl derivatives of gelatin according to the present invention the kind of gelatin used is not critical. Sulfonyl derivatives of gelatin may be made from acid processed gelatin having a high isoelectric point, or from an alkali processed gelatin having a low isoelectric point; further a gelatin may be used which has been partially hydrolyzed or a gelatin with good physical properties.

Sulfonyl derivatives of gelatin with widely varying properties can be prepared according to the invention, the properties depending upon the kind of sulfonylfluoride used as reagent. Accordingly the number of applications of the sulfonyl derivatives of gelatin prepared according to the method of this invention is very considerable.

According to the present invention, sulfonyl derivatives of gelatin can e.g. be prepared which precipitate from aqueous solution when this solution is acidified. Such sulfonyl derivatives of gelatin can be used for different purposes; when used to peptize silver halide in the manufacture of photographic emulsions the sulfonyl derivative of gelatin together with the silver halide grains can be precipitated by acidifying, whereafter the water-soluble impurities can be washed out.

In the preparation of such silver halide emulsions it is also possible first to prepare a silver halide emulsion by using common gelatin and then to transform the gelatin into its sulfonyl derivative by reaction with an aromatic compound containing sulfonyl fluoride groups.

It is also possible to prepare sulfonyl derivatives of gelatin according to the present invention which are resistant to the hardening action of formaldehyde. This property is likely to be of importance in the photographic art, e.g. in photographic two-layer materials, such as used for instance in silver halide diffusion transfer processes as described in our United Kingdom specification No. 654,631 and wherein one of two layers is hardened whereas the other layer remains unhardened.

According to a further application of the present invention, sulfonyl derivatives of gelatin can be prepared which after drying become insoluble in water. The layers cast from a solution of a mixture of some of these sulfonyl derivatives of gelatin and unmodified gelatin become likewise insoluble in water. Such derivatives are mainly of importance in the formation of photographic layers which are to be treated in different aqueous baths without losing their firmness.

A particular advantage afforded by the present invention is, that by the use of compounds containing sulfonylfluoride groups and other reactive groups, for instance amino groups, it is possible to prepare in a one-step process gelatin derivatives containing aromatic nuclei substituted by amino groups. These amino groups can, for instance by diazotization, lead to gelatin derivatives containing azo groups, in other words to azo dyestuffs which are chemically bound to the gelatin molecule.

The following are a few examples illustrating the preparation of certain sulfonyl derivatives of gelatin according to the present invention.

*Example 1*

A solution of 50 g. of gelatin (isoelectric point 4.8) in 450 cm.³ of water is heated to 45° C. and the pH is brought at 10 by adding sodium hydroxide. Next, whilst vigorously stirring, a solution of 8 g. of p-toluene sulfofluoride in 80 cm.³ of dimethylformamide is added and the reaction mixture is kept for 2 hr. at 45° C., taking care to keep the pH at 10 by addition of suitable amounts of sodium hydroxide. The solution is cooled to about 30° C. and the pH is lowered to 2.5 with sulfuric acid, whereby the p-toluene sulfonyl derivative of gelatin precipitates and can be separated either by filtration or by decanting the supernatant liquid.

*Example 2*

A solution of 50 g. of gelatin (isoelectric point: 4.8) in 500 cm.³ of water is heated to 40° C. and the pH brought at 10. Whilst vigorously stirring, a solution of 8 g. of p-aminobenzene sulfofluoride in 100 cm.³ of dimethylformamide is added dropwise. The reaction mixture is kept for 1 hr. at 42° C. and at pH 10, whereafter the solution is cooled, jellified, noodled and washed. After washing, the p-aminobenzene sulfonyl derivative of gelatin is dried in an air current. The product is used for forming a diazonium salt by means of sodium nitrite and hydrogen chloride. This diazonium salt can be coupled in order to form an azo dyestuff derivative of gelatin. When using e.g. β-naphthol, an intensively orange-coloured gelatin derivative is obtained. When using 1,8-dihydroxy-3,6-naphthalene disulfonic acid, an intensively violet-coloured gelatin derivative is obtained.

*Example 3*

A solution of 100 g. of gelatin (isoelectric point: 8.5) in 550 cm.³ of water is heated to 40° C. and the pH brought at 10 with sodium hydroxide. Whilst vigorously stirring, a solution of 12 g. of m-fluorosulfonyl benzoic acid in 100 cm.³ of dimethylformamide is added dropwise over about 10 minutes. The solution is kept at pH 10 with sodium hydroxide and maintained for 30 minutes at 42° C., whereafter it is cooled to about 30° C. The pH is lowered to 3 with sulfuric acid, whereby the m-carboxyphenylsulfonyl derivative of gelatin precipitates and can be isolated. After redissolving the precipitate at pH 7, the solution is jellified, noodled and dried.

*Example 4*

To a solution at 50° C. of 55 g. of gelatin (pH 10) in 600 cm.³ of water are added 12 g. of p-fluorosulfonyl acetanilide dissolved in 100 cm.³ of dimethylformamide. The pH is kept at 10 with sodium hydroxide. After maintaining the reaction mixture for 45 minutes at 45° C., the pH of the solution is lowered to 7, and the solution is cooled, jellified, noodled and washed. After remelting, the washed p-acetylanilido sulfonyl derivative of gelatin is coated onto glass-plates and dried. The layers thus obtained are stored for 36 hrs. at 50° C. and 40% relative humidity. After this treatment, these layers are resistant to treatment in water of 70° C., where unmodified gelatin easily dissolves at 35° C.

*Example 5*

Example 4 is repeated, but after remelting the p-acetylanilido sulfonyl derivative of gelatin is added to a solution of an equal amount of unmodified gelatin. This mixture is brought to pH 8, coated onto glass-plates, jellified and dried. After storing for 36 hrs. at 50° C. and 40% relative humidity, the layers thus obtained resist much better treatments in baths of different temperature and pH than layers cast from pure gelatin.

*Example 6*

A solution of 25 g. of gelatin in 125 cm.³ of water is heated to 60° C. and brought to pH 10. Whilst vigorously stirring, a solution of 5 g. of p-fluorosulfonyl salicylic acid in 50 cm.³ of acetone is added dropwise over 20 minutes. The pH of the solution is kept at 10 with sodium hydroxide, and the reaction mixture is maintained for 30 minutes at pH 9 and at 50° C. Next, the solution is cooled, jellified, noodled and washed to yield the 1-carboxy-2-hydroxy-4-sulfonyl benzene derivative of gelatin. A silver halide dispersion is prepared by adding an aqueous solution of 100 g. of silver nitrate to an aqueous solution of potassium bromide containing 20 g. of the above prepared gelatin derivative. After digestion, the pH of this dispersion is lowered to 3 with sulphuric acid and the silver halide which precipitates together with the gelatin derivative is allowed to settle. The supernatant liquid is decanted and the precipitate is washed with water. To this precipitate water is added until a total volume of about 250 cm.³ and this mixture is warmed to about 45° C. after adjusting the pH at 6.5 in order to redissolve the gelatin derivative. This suspension is then added to 1000 cm.³ of an 8% aqueous gelatin solution. After chemical ripening and addition of coating solutions as known in the art, layers with very good photographic characteristics are cast from this light-sensitive emulsion.

*Example 7*

500 cm.³ of a 10% aqueous gelatin solution is heated to 42° C. and brought at pH 10 with sodium hydroxide. Whilst vigorously stirring, a solution of 40 g. of benzoyl-(3-fluorosulfonyl)-acetanilide according to the formula

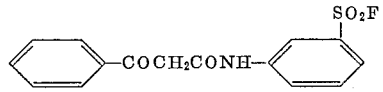

in 440 cm.³ of acetone is added. The solution is kept at pH 10 by addition of the appropriate amount of sodium hydroxide. Meanwhile 130 cm.³ of dimethylformamide are added and the solution is kept for 2 hours at 42° C. Next the solution is poured out into acetone whereby the benzoyl-3-sulfonyl)-acetanilide derivative of gelatin precipitates. The supernatant liquid is decanted, and the gelatin derivative is redissolved in water and again precipitated in acetone, separated and dried. After redissolving in water, the gelatin derivative could also be precipitated by bringing the pH of the aqueous solution at 3 by means of sulphuric acid. The precipitate is washed with cold water and dried. The benzoyl-(3-sulfonyl)-acetanilide derivative of gelatin thus obtained can be used as a non-diffusing water-soluble yellow colour coupler in the manufacture of photographic emulsions for colour photography.

We claim:

1. A method of preparing a hardened photographic gelatino silver halide emulsion which comprises the steps of adding to an aqueous solution of silver nitrate an aqueous solution of a potassium halide containing also 20% by weight based on the silver nitrate of a sulfonyl derivative of gelatin prepared according to the method described in claim 3, acidifying the emulsion obtained to precipitate said sulfonyl derivative of gelatin together with the silver halide, washing this precipitate with water, redissolving said sulfonyl derivative of gelatin by adding water to said precipitate, heating to about 45° C., and acidifying to pH 6.5, and adding a required amount of binding agent.

2. A method of preparing sulfonyl derivatives of gelatin which comprises reacting said gelatin with a monocyclic aryl sulfofluoride by vigorously admixing a solution of said sulfofluoride to an aqueous solution containing 9–20% gelatin maintained at a pH within the range of pH 8–10.

3. A method of preparing sulfonyl derivatives of gelatin which comprises adding to a 9–20% aqueous solution of gelatin of pH 8–10 whilst vigorously stirring, a solution in a solvent selected from the group consisting of dimethylformamide and acetone of an aromatic compound containing a fluorosulfonyl group selected from the group consisting of p-toluene sulfofluoride, p-aminobenzene sulfofluoride, m-fluorosulfonyl benzoic acid, p-fluorosulfonyl acetanilide, p-fluorosulfonyl salicylic acid and benzoyl - (3 - fluorosulfonyl) - acetanilide, said aromatic compound reacting with said gelatin in solution to produce said sulfonyl gelatin derivative.

References Cited by the Examiner
UNITED STATES PATENTS

| | | | |
|---|---|---|---|
| 2,614,928 | 10/1952 | Yutzy et al. | 96—94 |
| 2,725,295 | 11/1955 | Allen et al. | 96—111 |
| 2,794,796 | 6/1957 | Cavanaugh | 260—117 |

FOREIGN PATENTS

| | | |
|---|---|---|
| 592,050 | 4/1960 | Belgium. |
| 649,545 | 1/1951 | Great Britain. |
| 808,276 | 2/1959 | Great Britain. |

NORMAN G. TORCHIN, *Primary Examiner.*

HAROLD BURSTEIN, *Examiner.*

UNITED STATES PATENT OFFICE
CERTIFICATE OF CORRECTION

Patent No. 3,223,528                            December 14, 1965

Marcel Nicolas Vrancken et al.

It is hereby certified that error appears in the above numbered patent requiring correction and that the said Letters Patent should read as corrected below.

In the grant, line 3, after "Belgium," insert -- assignors to Gevaert Photo-Producten N.V., of Mortsel, Belgium, a Belgian company, --; lines 12 and 13, for "Marcel Nicolas Vrancken, Arthur Henri De Cat, and Jozef Frans Willems, their heirs" read -- Gevaert Photo-Producten N.V., its successors --; in the heading to the printed specification, lines 4 to 7, for "Marcel Nicolas Vrancken, Ringlaan 31, Berchem-Antwerp, Belgium; Arthur Henri De Cat, Ter Varentstraat 62, Mortsel-Antwerp, Belgium; an Jozef Frans Willems, Sterrenlaan 52, Wilrijk-Antwerp, Belgium" read -- Marcel Nicolas Vrancken, Berchem-Antwerp, Belgium, Arthur Henri De Cat, Mortsel-Antwerp, Belgium, and Jozef Frans Willems, Wilrijk-Antwerp, Belgium, assignors to Gevaert Photo-Producten N.V., Mortsel, Belgium, a Belgian company --.

Signed and sealed this 29th day of November 1966.

(SEAL)
Attest:

ERNEST W. SWIDER                                      EDWARD J. BRENNER
Attesting Officer                                    Commissioner of Patents